No. 664,172. Patented Dec. 18, 1900.
W. NELSON.
BUDDING IMPLEMENT.
(Application filed Aug. 9, 1900.)
(No Model.)
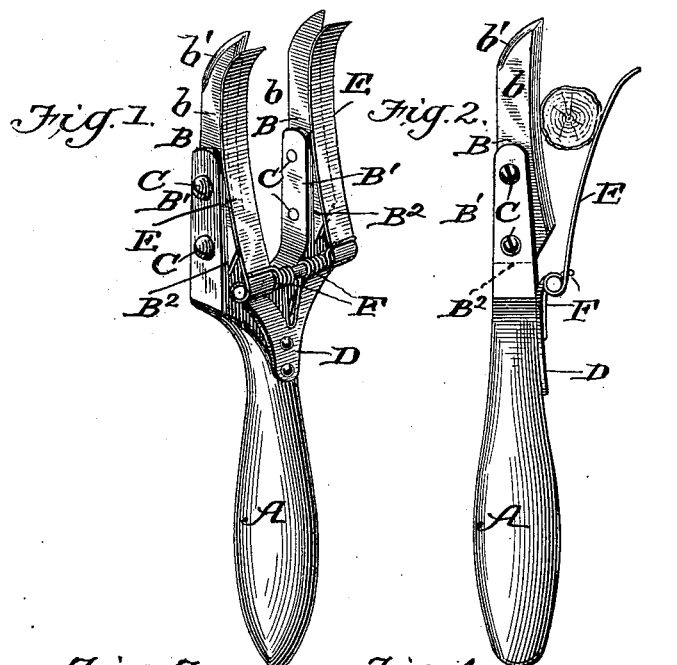
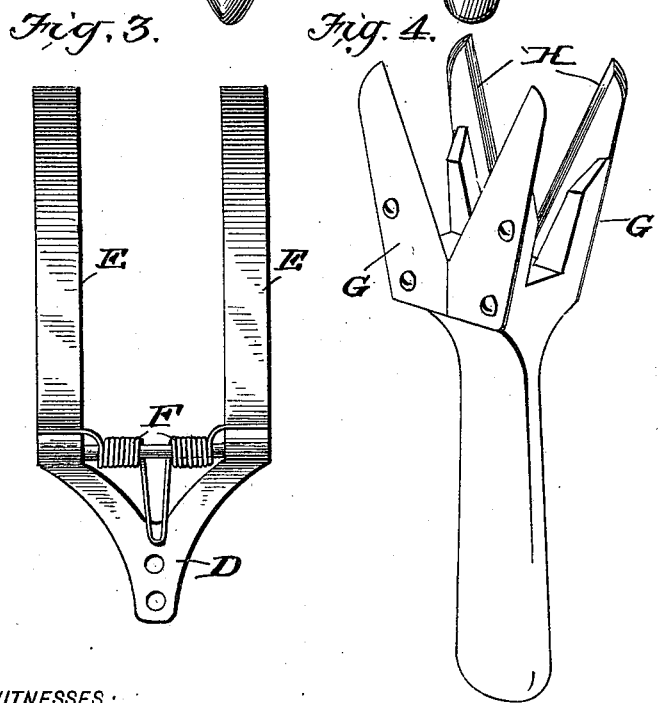
WITNESSES:
Jos. A. Ryan
Percy B. Turpin.
INVENTOR
William Nelson.
BY Munn & Co.
ATTORNEYS.

UNITED STATES PATENT OFFICE.

WILLIAM NELSON, OF JEFFERSON PARISH, LOUISIANA.

BUDDING IMPLEMENT.

SPECIFICATION forming part of Letters Patent No. 664,172, dated December 18, 1900.

Application filed August 9, 1900. Serial No. 26,419. (No model.)

*To all whom it may concern:*

Be it known that I, WILLIAM NELSON, residing in the parish of Jefferson, in the State of Louisiana, have made certain new and useful Improvements in Budding Implements, of which the following is a specification.

My invention is an improved implement for use in budding an eye from a choice variety of fruit onto a hardy or common variety; and the invention consists in certain novel constructions and combinations of parts, as will be hereinafter described and claimed.

In the drawings, Figure 1 is a perspective view of an implement embodying my invention. Fig. 2 is a side view thereof as in use. Fig. 3 is a detail view illustrating the spring for holding the tool or implement against the stock on which it is operating, and Fig. 4 is a perspective view showing a somewhat different form of implement.

In the operation of budding it is usual to remove the bark, in the first place, from the tree to be budded, and then to remove a similar piece of bark from a limb of a tree bearing a fine variety of fruit, and it is desirable to have the piece of bark to be budded onto the tree of the same size as the piece previously cut from the tree to be budded. In carrying out my invention I provide parallel blades which may be operated transversely of the stock to be budded and that from which the bud is to be removed, so the bud-section may correspond in size and shape to the space provided for it on the tree to be budded.

In the construction shown in Fig. 1 the implement consists of a suitable handle A, which may be of wood, metal, or other suitable material, and the blades B, secured to said handle and spaced apart and extending parallel, as shown. In securing the blades to the handle it may be preferred to form the latter in its head B' with slots B², in which are fitted the butt-ends of the blades, which are then secured in place by screws C, which may be made of the best material, with a raised rounded head having a deep nick and closely and deeply threaded, so they will not quickly wear out. The edges of the blades B at *b* project beyond the handle and are sharpened, being preferably beveled or sharpened on their outer sides, as shown. The ends of the blades opposite the edges *b* are preferably curved and sharpened at *b'*, as shown, and may be used in stripping the bud-section longitudinally of the stock, as well as in stripping longitudinally the bark from the stock which is to be budded.

It may be preferable in some instances to provide the tool or implement shown in Fig. 1 with a spring to press against the stock being budded, on the opposite side thereof from the blades, in order to hold the tool firmly against the stock. In Figs. 1, 2, and 3 I show a desirable form of such spring, which comprises a plate D, secured to the handle A and having arms E pivoted thereto and actuated by a coil-spring F, the arms E being arranged in line with and so they will oppose the blades B in the operation of the device, as shown in the drawings.

In the construction shown in Fig. 4 I arrange the blades G in two pairs, suitably secured to the handle, with the cutting edges H of the blades of each pair facing each other and forming a triangular recess in which fits the stock to be operated upon. This is a simple construction which will efficiently operate to cut the stock transversely as desired.

In operation it will be noticed that by using the improved tool both for cutting the bark from the limb to be budded and the section of bark with the bud the latter can be made to exactly fit the space cut out for it, and the entire operation can be performed by the improved tool or implement, it not being necessary to lay down the knife to take up another to split the bark or cut off leaves, &c., as all can be done with the implement shown and before described.

Having thus described my invention, what I claim, and desire to secure by Letters Patent, is—

1. An implement for use in budding comprising a handle and blades secured thereto and spaced apart and having one edge sharpened and their opposite edges rounded at the ends of the blades and sharpened, substantially as set forth.

2. An implement substantially as described, provided with the parallel blades arranged to operate transversely of the stock and with the spring device to bear on the opposite sides of said stock from the said blades, substantially as set forth.

3. An implement substantially as described comprising the handle, the blades secured thereto, arranged parallel as shown, and the opposing spring device consisting of a plate held to the handle, arms pivoted to said plate and actuating spring devices, substantially as set forth.

4. An implement for use in budding provided with blades spaced apart with edges adapted to operate transversely upon the stock, and edged at the outer end to form a cutter for splitting the bark, substantially as set forth.

WILLIAM NELSON.

Witnesses:
JAMES L. HARRIS,
GABRIEL H. FUSELIER.